(12) United States Patent
Heap et al.

(10) Patent No.: US 8,597,158 B2
(45) Date of Patent: Dec. 3, 2013

(54) METHOD AND APPARATUS FOR SIMULTANEOUS PARALLEL CONTROL OF A TORQUE PHASE AND AN INERTIA PHASE FOR HYBRID POWERTRAINS

(75) Inventors: Anthony H. Heap, Ann Arbor, MI (US); Lawrence A. Kaminsky, White Lake, MI (US); Sean W. McGrogan, Ann Arbor, MI (US); Lisa M. Talarico, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/163,668

(22) Filed: Jun. 17, 2011

(65) Prior Publication Data

US 2012/0322611 A1    Dec. 20, 2012

(51) Int. Cl.
*B60W 10/02*    (2006.01)
*B60W 20/00*    (2006.01)

(52) U.S. Cl.
USPC .................................. 477/5; 475/5

(58) Field of Classification Search
USPC ........................................ 192/56.4
See application file for complete search history.

(56) References Cited

U.S. PATENT DOCUMENTS

| | | | |
|---|---|---|---|
| 4,321,991 A * | 3/1982 | Teijido et al. | 477/39 |
| 5,935,035 A * | 8/1999 | Schmidt | 475/5 |
| 6,740,002 B1 * | 5/2004 | Stridsberg | 477/14 |
| 8,241,174 B2 * | 8/2012 | Wallner et al. | 477/5 |
| 8,272,992 B2 * | 9/2012 | Mittelberger et al. | 477/5 |
| 8,285,462 B2 * | 10/2012 | Heap et al. | 701/54 |
| 2004/0211639 A1 * | 10/2004 | Dion | 192/55.1 |
| 2009/0312143 A1 * | 12/2009 | Allgaier et al. | 477/5 |
| 2012/0059539 A1 | 3/2012 | Arnett et al. | |
| 2012/0310455 A1 | 12/2012 | Arnett et al. | |
| 2012/0319634 A1 | 12/2012 | McGrogan et al. | |
| 2012/0322600 A1 | 12/2012 | Sah et al. | |
| 2012/0322610 A1 | 12/2012 | Sah et al. | |
| 2012/0323401 A1 | 12/2012 | McGrogan et al. | |
| 2012/0323416 A1 | 12/2012 | McGrogan et al. | |
| 2012/0323418 A1 | 12/2012 | Sah et al. | |
| 2012/0323461 A1 | 12/2012 | Martini et al. | |

FOREIGN PATENT DOCUMENTS

WO    WO2007/085362    *    8/2007

* cited by examiner

*Primary Examiner* — David D Le
*Assistant Examiner* — Mark Manley

(57) ABSTRACT

A method to execute a shift in a powertrain including a plurality of torque generative devices rotatably connected through a first clutch includes operating the powertrain in a continuously variable operating range state, and monitoring a command to execute the shift including monitoring a target speed for a first torque generative device, and monitoring a command to disengage the first clutch. The first clutch is shifted from an engaged state to a disengaged state, including operating a torque phase of the first clutch wherein the first clutch is transitioned from the engaged state to the disengaged state, and simultaneous with the torque phase, operating an inertia speed phase of the first clutch wherein a speed of the first torque generative device is transitioned from an initial speed to the target speed.

19 Claims, 3 Drawing Sheets

METHOD AND APPARATUS FOR SIMULTANEOUS PARALLEL CONTROL OF A TORQUE PHASE AND AN INERTIA PHASE FOR HYBRID POWERTRAINS

TECHNICAL FIELD

This disclosure is related to control of a powertrain.

BACKGROUND

The statements in this section merely provide background information related to the present disclosure. Accordingly, such statements are not intended to constitute an admission of prior art.

Powertrains can utilize a variety of energy sources to provide power to a torque generative device of the powertrain. Electrical power can be provided from an energy storage device and the electrical power can be used to provide motive or propelling torque to the powertrain through the torque generative device.

Powertrains can utilize more than a single source of power. For example, a hybrid drive powertrain can utilize electrical power through a motor or motors and petroleum energy though an exemplary gasoline or diesel internal combustion engine. Other sources of energy are known including fuel cells and biodiesel or E85 engines. Electrical power can be recovered through operation of the vehicle, for example, through regenerative braking. Further, electrical power can be created and energy stored in the energy storage device through directly driving a motor with an engine, for example, as a belt driven device. Further, the energy storage device can be charged through a plug-in connection to an infrastructure power grid.

Desired operation of the powertrain can be determined through an input device such as an operator pedal position. This desired operation can be processed as an output torque request signal ($T_{O\_REQ}$). Based upon ($T_{O\_REQ}$, an engine, electric motor, and/or other torque generative devices and the transmission are operated to deliver the requested operation of the powertrain.

SUMMARY

A method to execute a shift in a powertrain including a plurality of torque generative devices rotatably connected through a first clutch includes operating the powertrain in a continuously variable operating range state, and monitoring a command to execute the shift including monitoring a target speed for a first torque generative device, and monitoring a command to disengage the first clutch. The first clutch is shifted from an engaged state to a disengaged state, including operating a torque phase of the first clutch wherein the first clutch is transitioned from the engaged state to the disengaged state, and simultaneous with the torque phase, operating an inertia speed phase of the first clutch wherein a speed of the first torque generative device is transitioned from an initial speed to the target speed.

BRIEF DESCRIPTION OF THE DRAWINGS

One or more embodiments will now be described, by way of example, with reference to the accompanying drawings, in which:

FIG. 2-1 illustrates an engine speed and a motor speed through an exemplary shift including a torque phase and an inertia speed phase initiated at substantially the same time, in accordance with the present disclosure;

FIG. 2-2 illustrates an engine speed and a motor speed through an exemplary shift including a torque phase and an inertia speed phase operated simultaneously and the torque phase ending with a sudden unlocking of the clutch, in accordance with the present disclosure.

DETAILED DESCRIPTION

Figure 1:
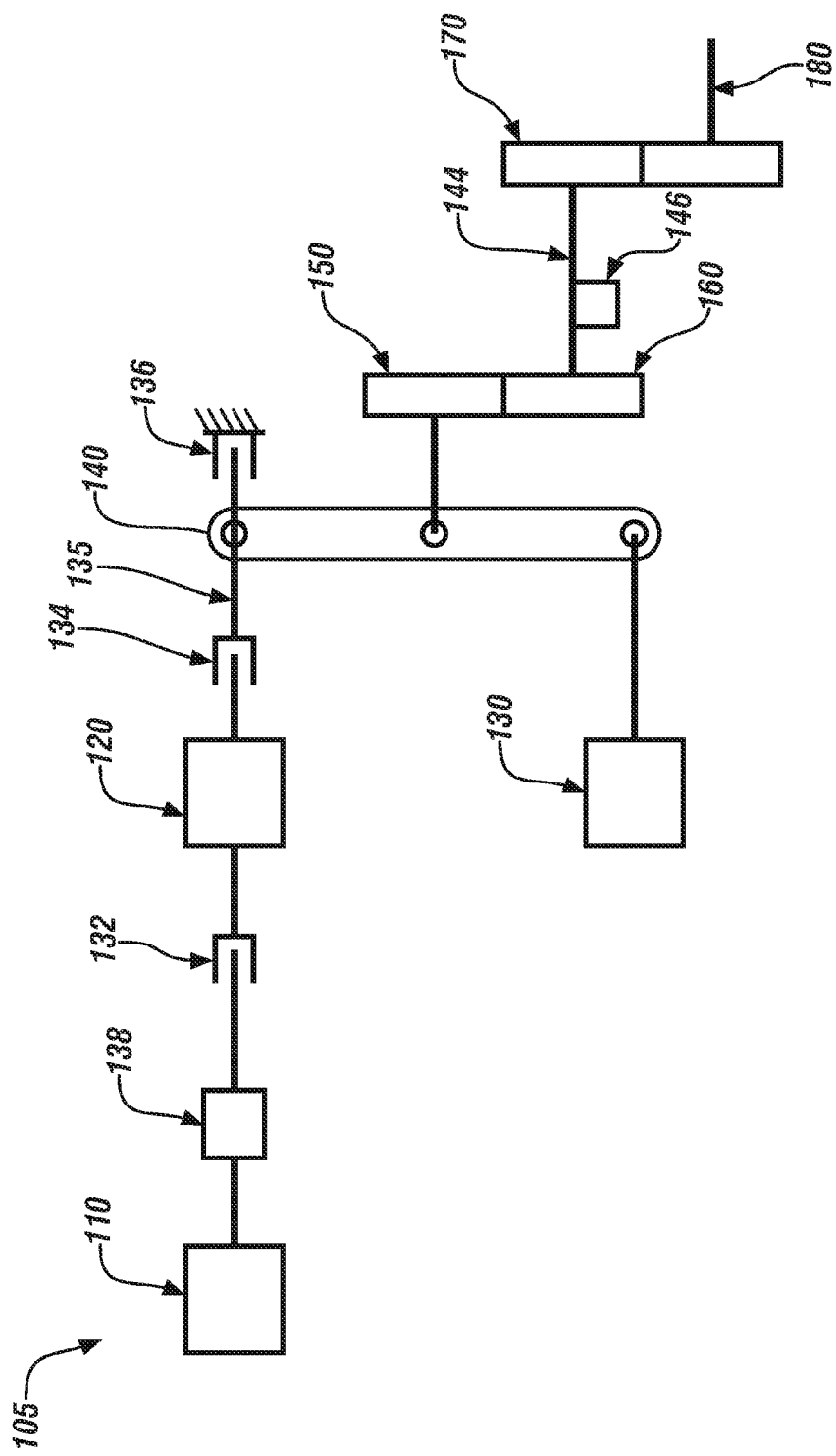
FIG. 1 illustrates an exemplary electric drive powertrain, in accordance with the present disclosure.

Referring now to the drawings, wherein the showings are for the purpose of illustrating certain exemplary embodiments only and not for the purpose of limiting the same, FIG. 1 illustrates an exemplary hybrid electric drive powertrain 105 including an internal combustion engine 110, a first electric motor 120, a second electric motor 130, a planetary gear set 140, transfer gears 150, 160, and 170, and output shaft 180. Powertrain 105 can be operated in any of a number of configurations based upon selective operation of engine 110 and motors 120 and 130. Further, powertrain 105 includes clutches 132, 134, and 136 which can be engaged or disengaged to change the configuration of the powertrain. Clutch 132 selectively mechanically couples engine 110 to motor 120. Clutch 134 selectively mechanically couples motor 120 to a gear of planetary gear set 140. Clutch 136 selectively grounds the same gear of planetary gear set 140. Transmission output speed sensor 146 monitors a speed of shaft 144 between transfer gears 160 and 170. Damper 138 is between engine 110 and clutch 132 to provide a damping or smoothing of the interaction between the engine and motor 120 when clutch 132 is engaged.

Motors 120 and 130 can supply torque to powertrain 105. According to one exemplary embodiment, engine 110 is used to provide power to motor 120 for the purpose of regenerating an energy storage device supplying electrical energy to motors 120 and/or 130. In such a function, supplying power for a purpose of regeneration rather than supplying torque to the powertrain for the purpose of driving the output shaft, powertrain 105 is referred to as an electric drive powertrain and engine 110 is referred to as a range extender.

Powertrain control can include controlling torque generation based upon an output torque request ($T_{O\_REQ}$) or a desired torque to be delivered to the output shaft of the powertrain. According to one exemplary control method, inputs from an operator are monitored by a control module, for example, including an accelerator pedal position, and the inputs are utilized to generate $T_{O\_REQ}$. Depending upon the particular powertrain, the output torque request can be used by various control modules, including a transmission control module, a hybrid control module, an engine control module, or a motor control module, to command the various components to the powertrain to deliver torque to the output shaft according to the output torque request. According to one exemplary embodiment, the output torque request can be monitored or derived by an engine and hybrid control module, transforming the output torque request into commands. Motors of a hybrid drive powertrain or an electric drive powertrain receive torque commands from a control module and operate based upon those torque commands.

Powertrain 105 includes clutches 132, 134, and 136. A clutch can be operated in an engaged and fully locked state, wherein torque can be transmitted through the clutch and slip or relative speed across plates of the clutch is substantially zero. In a fully locked state, the plates of the clutch are synchronized. A clutch can also be operated in an engaged and not locked state, wherein the plates of the clutch are in contact and torque is transmitted through the clutch, but the plates of the clutch slip. Such an engaged and unlocked state can occur when a torque transmitted through the clutch exceeds a maximum clutch torque capacity, $T_{MAX}$. An exemplary shift of a clutch starting in a locked and engaged state can include a torque phase, in which the clutch is locked and engaged, and a clamping force holding the plates of the clutch together is reduced in preparation for unlocking the clutch. An exemplary shift of a clutch can further include an inertia speed phase or speed phase, wherein one of the members must change speeds to match a desired powertrain configuration at the completion of the shift. The speed of that member can be changed through an inertia speed phase from an initial speed at the initiation of the inertia speed phase to a target speed. In order to transition a powertrain from one mode to another, a clutch connecting two shafts or members within the powertrain can transition in series, with a torque phase being followed by an inertia speed phase. Such a series transition disengages the members of the clutch fully at the initial speed or according to an initial speed profile through a torque phase, and after the members are no longer locked, a member of the clutch can then operate an inertia speed phase to achieve a target speed for the member.

Powertrain 105 can operate in a number of modes. For example, if clutch 136 is locked such that one of the gears of planetary gear 140 is grounded, then the powertrain can operate in a fixed gear mode or a mode wherein an input speed divided by the output speed equals a fixed value. When clutch 136 is unlocked and some combination of engine 110, motor 120, and motor 130 provide torque to planetary gear 140, the powertrain can operate in a continuously variable operating range state, wherein the input speed divided by the output speed can provide a variable gear ratio based upon operation of the torque generative devices and the associated clutches.

Because the output speed and output torque are variable in relation to the input of either motor 120 or motor 130, the powertrain can be said to be operating in a variable gear ratio mode. One difference between operating in a fixed gear mode and a variable gear ratio mode includes flexibility in the powertrain at a fixed or desired output speed. In a fixed gear mode, any change to an input speed translates to a change in the output speed. In a variable gear ratio mode, a fixed or desired output speed can be maintained despite variation in input speeds based upon altering operation of the inputs. According to one embodiment, a speed and torque of motor 130 and a speed and torque of shaft 135 can each be varied to maintain a desired speed and desired torque of output shaft 180 while gaining a degree of freedom in the operation of the torque generative devices as compared to operation in a fixed gear mode. With this extra degree of freedom enabled by operation in a continuously variable operating range state, the speed of a motor of a powertrain with a clutch engaged and fully locked to a transmission is not dictated by the output speed of the transmission. For example, if both motors 120 and 130 are operating at fixed speeds, and a transition is commanded wherein the speed of motor 120 needs to be reduced, operation of motor 130 can be adjusted to maintain the fixed or desired output speed despite the change in motor 120. In a related transition, if clutch 134 is engaged and motor 120 is providing torque to the planetary gear set, and a command is monitored wherein motor 120 is to transition to a zero speed, operation of motor 130 can be varied to maintain a desired output speed and output torque throughout the transition.

In addition to modes based upon a gear ratio relationship between an input or inputs to an output, modes can be based upon a function of the powertrain. For example, a mode, including clutch 136 engaged and fully locked, includes a single motor providing torque to the output with a fixed ratio between the speed of the motor and the output speed. Operation in this mode can be termed a one motor electric vehicle mode or mode one. In another mode wherein clutch 134 is engaged and fully locked and both motors 120 and 130 are being utilized to provide torque to the powertrain, operation in this mode can be termed a two motor mode or mode two. In another mode, clutch 132 and 136 can be locked and motor 130 can be used to provide torque to the powertrain, while engine 110 can be used to provide torque to motor 120 in order to charge an energy storage device or provide electrical power directly to motor 130. Operation in this mode can be termed a series hybrid mode or a mode one engine on. In another mode, clutch 132 and 134 can be locked and engine 110 and motor 120 can provide torque in parallel to motor 130. Operation in this mode can be termed a load share mode or a mode two engine on. A number of modes in which a powertrain can operate are envisioned, and the disclosure is not intended to be limited to the particular exemplary embodiments provided herein. Any command to transition between modes of the powertrain can include commands to execute a shift within a clutch of the powertrain and/or a command to change a speed of an electric motor and/or engine and attached input shaft to a target speed.

In one exemplary transition of a powertrain, an engine and a first electric motor are initially connected through a first clutch, the first electric motor is connected to a second clutch which is initially engaged and connects the first motor to a shaft connected to a gear of a planetary gear set, and a third clutch that is operable to ground the shaft is initially in an unlocked state. Additionally, a second electric motor is connected to a different gear of the planetary gear set and is capable of providing torque to the powertrain through the planetary gear set. As a result of the commanded transition, the engine and first motor can be commanded to be disengaged and the first motor can be commanded to bring the speed of the shaft to zero in preparation for ground the shaft through engagement of the third clutch. The engine and the first electric motor are initially connected and providing torque to the powertrain in cooperation with a second electric motor simultaneously providing torque to the powertrain. Because the powertrain is configured to run in a continuously variable operating range state and has a degree of freedom to change a speed of an electric motor without affecting the output speed or torque, a change can be commanded to a mode wherein only the second electric motor provides torque to the powertrain, enabling a gear of a planetary gear set connected to the first electric motor be brought to a target speed of zero or a zero speed. In such an exemplary transition, even though the first electric motor might eventually be free to spin with the engine, because the first electric engine is being transitioned to a target speed outside of a normal operating range the engine, the engine needs to be disconnected from the first motor to prevent the engine from stalling or causing drivability issues.

In another exemplary transition, an engine and a first electric motor can be initially connected and a clutch selectively connecting the first electric motor to a planetary gear set of the powertrain can initially be unlocked and disengaged. Further, a second electric motor can be initially utilized alone to provide torque to the powertrain through the planetary gear set. A change can be commanded to a mode wherein the first and second electric motors cooperatively provide torque to the powertrain and the engine is disconnected from the first electric motor. Wherein the engagement of this clutch requires the first motor to change to a target speed outside of the normal operating range of the engine, the engine must be disconnected from the first motor to prevent the engine from stalling or causing drivability issues.

Applied to powertrain 105, an exemplary transition can include an initial state wherein clutches 132 and 134 are engaged and locked and a second state wherein clutch 132 is shifted to an unlocked state while clutch 134 remains engaged. In one example, clutch 136 can then be engaged while clutch 134 remains engaged. In another example, clutch 134 can be shifted to an unlocked state when clutch 136 is engaged. Another exemplary transition can include an initial state wherein clutches 132 and 136 are engaged and locked and a second state wherein clutch 132 is shifted to an unlocked state while clutch 136 remains engaged. In one example, clutch 134 can then be engaged while clutch 136 remains engaged. In another example, clutch 136 can be shifted to an unlocked state when clutch 134 is engaged.

If engine 110 and motor 120 are rotatably connected by clutch 132, and motor 120 is commanded to transition to a speed at which engine 110 is capable of operating, the powertrain can simply transition to the new speed with engine 110 and motor 120 remaining connected. However, motor 120 is commanded to transition to a speed at which engine 110 is not operable, outside of an operating range of the engine, or if motor 120 operating independently of engine 110 is otherwise desirable, for example, the independent operation permitting the shut-down of engine 110, a shift to disconnect engine 110 and motor 120 can be executed including a torque phase on clutch 132 to disconnect engine 110 and motor 120 and an inertia speed phase to transition motor 120 to a target speed. A torque phase and an inertia speed phase can be operated on clutch 132 in series, but operating these phases in series results in the shift taking at least as long as the duration of first the torque phase and then the inertia speed phase. Depending upon the operation of the powertrain and the expectations of an operator of the powertrain, executing the shift through the duration of both phases in series can cause the shift time to be unacceptably long or cause drivability issues. A method is disclosed for a powertrain operating in a continuously variable operating range state to operate a torque phase and an inertia phase simultaneously in a clutch, with members of the clutch operating at substantially a same speed until the torque phase is completed while changing a speed of the motor based upon a target speed. Wherein an electric motor is connected to one member of the clutch and an engine is connected to the other member of the clutch, by operating the motor and the engine in unison through the torque phase and simultaneously changing a speed of the motor, the torque phase and the inertia speed phase can be operated at the same time or in parallel, thereby saving time in the shifting process. According to one exemplary embodiment, the motor can provide the necessary torque to operate the inertia speed phase. In another embodiment, the motor can provide a portion of the torque to operate the inertia speed phase and additional torque can be provided through another connection, for example, from a second motor connected through a planetary gear set or through modulation of the connected engine. Methods disclosed herein can be operated upon powertrain 105 of FIG. 1, however the disclosure is not intended to be limited to exemplary powertrain embodiments, including various combinations of torque generative devices, or shift sequence examples provided herein.

Figures 1, 2:
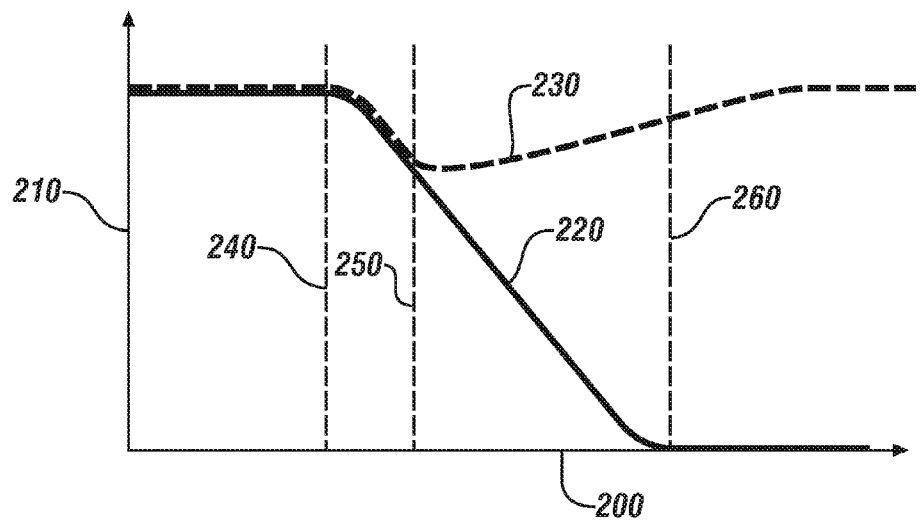
Figure 2:
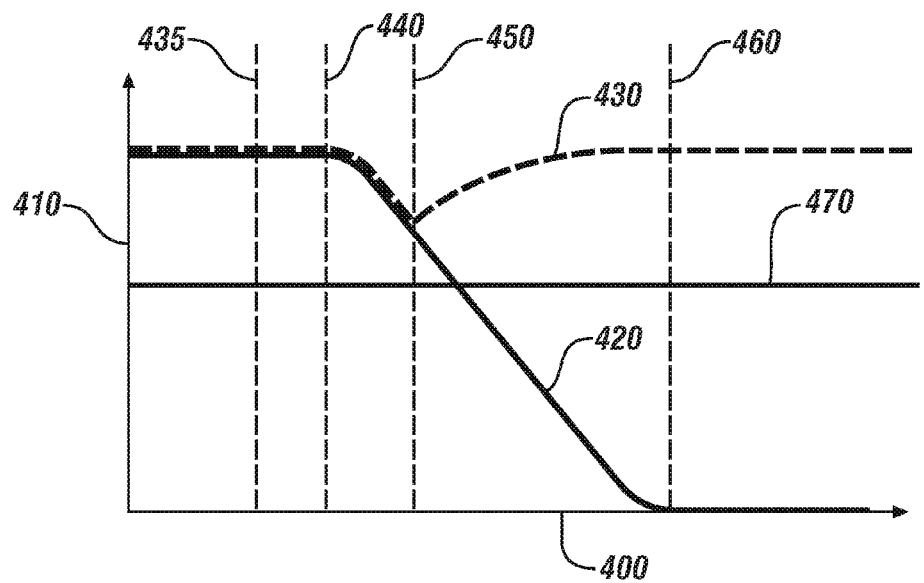

FIG. 2-1 illustrates an engine speed and a motor speed through an exemplary shift including a torque phase and an inertia speed phase initiated at substantially the same time. Horizontal axis 200 illustrates time and vertical axis 210 illustrates rotational speed of a device. Plot 220 illustrates a rotational speed of an electric motor, and plot 230 illustrates a rotational speed of an engine. Through an initial time span on the left side of the figure, the speed of the engine 230 and the speed of the motor 220 are equal and at a constant value. In the exemplary system illustrated in FIG. 1, these equal speeds are consistent with clutch 132 being engaged with a full clamping force such that engine 110 and motor 120 are rotatably connected with substantially equal speeds. At time 240, a shift is initiated. Based upon the initial speed of the electric motor and a target speed for the electric motor, an inertia speed phase is determined According to one exemplary method, the inertia speed phase can include a transition from the initial speed to a constant acceleration period, the constant acceleration period, and a transition from the constant acceleration period to the target speed. Other methods to determine or profile an inertia speed phase are known in the art. The constant acceleration period includes the portion of speed of the motor 220 wherein the speed changes as a straight line with a constant declining slope. Speed of the motor 220 reaches the target speed at the completion of the inertia speed phase at time 260. A target speed for the motor in FIG. 2-1 is illustrated as a speed of zero. However, the target speed can include any speed or can include a speed accommodating a dynamic speed profile. For example, a target speed can be selected based upon the electric motor accelerating at a constant rate at the completion of the inertia speed phase or based upon the motor dynamically synchronizing another clutch. In such an instance, the target speed and the shape of the inertia speed phase can be determined to permit a smooth lead in of the motor to the desired dynamic speed profile. At time 240 or substantially a same time that the inertia speed phase is initiated, a torque phase is also initiated, wherein a clutch rotatably connecting the engine and the motor and forcing the speed of the motor 220 and the speed of the engine 230 to be equal begins to transition from an engaged state to a disengaged state. In one embodiment, a clamping force between the plates of the clutch begins to reduce. From the beginning of the torque phase at time 240 to the completion of the torque phase at time 250, the speed of the motor 220 and the speed of the engine 230 remain equal. Such equal speeds can be controlled based upon commanding the speed of the motor 220 to follow the inertia speed phase profile while maintaining the torque applied through clutch below $T_{MAX}$ for the clutch until the end of the torque phase at time 250. At the completion of the torque phase at time 250, the clutch that rotatably connected the engine and the motor achieves a disengaged state, and the speed of the engine 230 can change independently of the speed of the motor 220. In FIG. 2-1, the speed of the engine 230 is illustrated to return to the initial speed of the engine, but in other embodiments, the speed can transition to any desired engine speed. In one embodiment, the clutch can be re-engaged quickly after time 260, and rapid recovery of the speed of the engine 230 to the original speed can be important. By operating the inertia speed phase and the torque phase of the shift simultaneously with substantially coincident start times, a time span or duration of a shift can be equal to a time span or duration of an inertia speed phase.

FIG. 2-2 illustrates an engine speed and a motor speed through an exemplary shift including a torque phase and an inertia speed phase operated simultaneously and the torque phase ending with a sudden unlocking of the clutch. Horizontal axis 400 illustrates time and vertical axis 410 illustrates rotational speed of a device. Plot 420 illustrates a rotational speed of an electric motor, and plot 430 illustrates a rotational speed of an engine. Through an initial time span on the left side of the figure, the speed of the engine 430 and the speed of the motor 420 are equal and at a constant value. At time 435, a shift is initiated. A torque phase begins at time 435. Based upon the initial speed of the electric motor and a target speed for the electric motor, an inertia speed phase is determined and begins at time 440. Between times 440 and 450, the torque phase and inertia speed phase operate simultaneously. A minimum speed of the engine 470 is illustrated. Speed of the engine 430 must stay above minimum speed of the engine 430 to avoid drivability issues or stalling the engine. According to one embodiment, maintaining speed of the engine 430 above the minimum speed of the engine 470 can be achieved or aided by controlling torque transmission through the clutch such that $T_{MAX}$ for the clutch will be exceeded and the clutch will break loose, permitting the engine to rapidly accelerate. At time 450, a torque transmitted through the clutch is permitted to exceed $T_{MAX}$ for the clutch, and the engine is permitted to rapidly accelerate back towards the initial speed of the engine 430. Speed of the motor 420 reaches the target speed at the completion of the inertia speed phase at time 460. A target speed for the motor in FIG. 2-2 is illustrated as a speed of zero.

During the torque phase, the speed of the engine and the speed of the motor will be substantially equal. In order for the engine and the motor to operate at a same speed through the torque phase, the changing speed of the engine must remain within a speed range that the engine is operable. An engine includes a minimum engine speed and a maximum engine speed. A minimum speed of an engine can be set by a number of parameters, for example, including a required speed for a hydraulic pump powered by the engine or by noise, vibration, and harshness (NVH) issues for the engine. A maximum speed for the engine can be selected based upon physical limitations of the engine, NVH issues, or other concerns known in the art. Further, a rate of change of the engine speed through the torque phase must remain within the limits of the engine to change speed. In some embodiments, a motor can change speed more rapidly than an engine, and a motor can react more quickly to commands than an engine. The commanded changes in speed through the torque phase, during which the engine speed must match the motor speed, must conform to changes that the engine can perform. During an early portion of the torque phase, in which most or a substantial fraction of the full clamping pressure remains on the members of the clutch, the motor can provide torque to the engine to assist changing the engine speed while maintaining the clutch in synchronous operation which can increase the rate at which the engine can change speed. An inertia speed phase can be determined including limits that maintain the engine within an operating speed range of the engine and do not require the engine speed to change more quickly than the engine can change speed. In one embodiment, the requested change can be monitored, a candidate shift including simultaneously initiating a torque phase and an inertia speed phase can be determined, and the candidate shift can be permitted or disallowed based upon whether the limits of the engine are exceeded.

Figure 3:
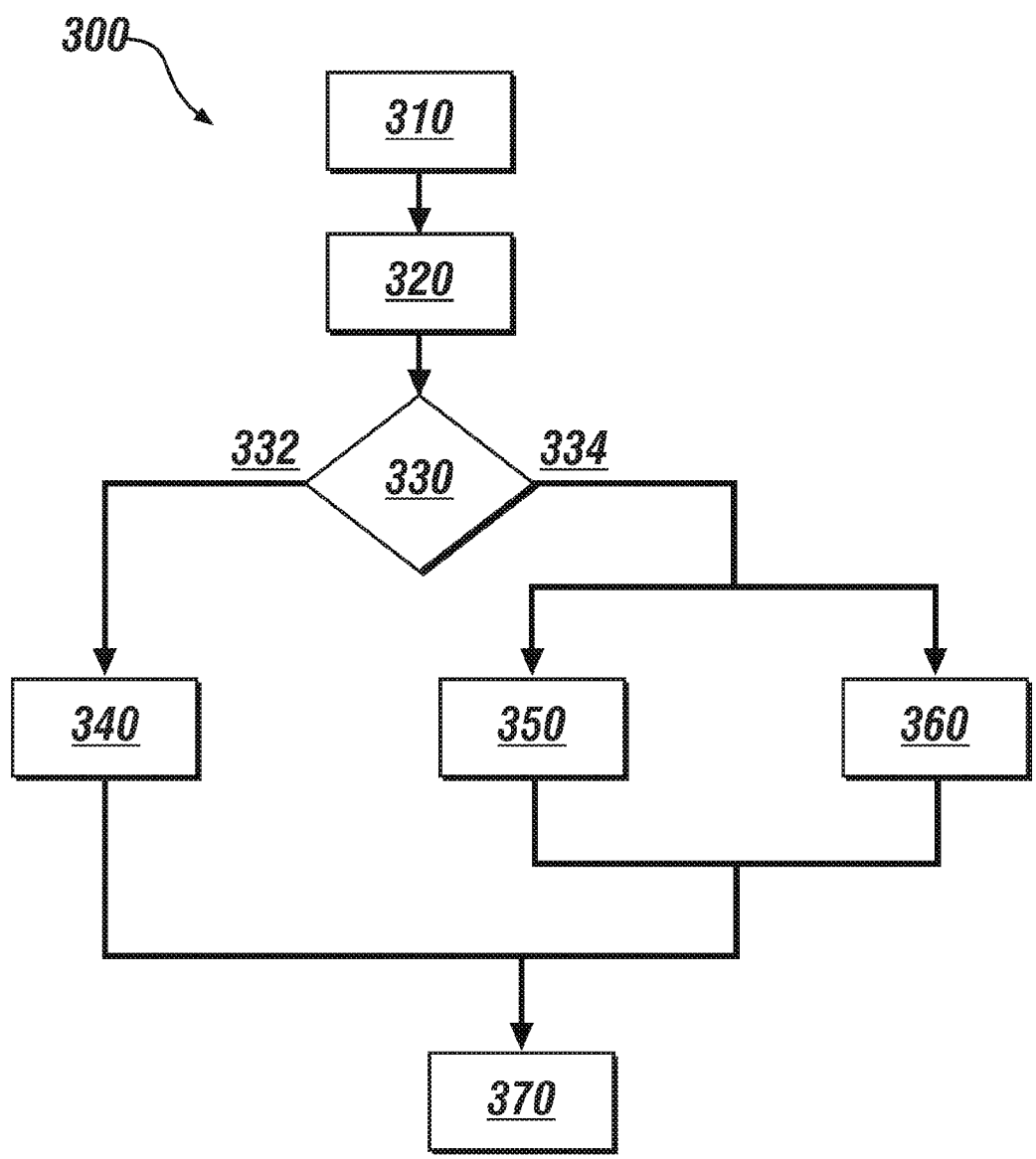
FIG. 3 illustrates an exemplary process to execute a shift including a torque phase and an inertia speed phase starting at substantially the same time, in accordance with the present disclosure.

FIG. 3 illustrates an exemplary process to execute a shift including a torque phase and an inertia speed phase starting at substantially the same time. Table 1 provides a key for FIG. 3.

TABLE 1

| Block | Description |
| --- | --- |
| 310 | Begin |
| 320 | Monitor a Command to Change a Mode of the Powertrain Requiring a Shift Including a Target Speed for the First Electric Motor |
| 330 | Determine Whether a Torque Phase and an Inertia Speed Phase Can Be Operated Simultaneously without Violating Limits of the Engine |
| 340 | Operate the Shift in Series |
| 350 | Initiate Torque Phase |
| 360 | Initiate Inertia Speed Phase |
| 370 | End |

Process 300 begins at block 310. A powertrain includes an engine initially connected through a clutch to an electric motor. At block 320, a command to change a mode of the powertrain is monitored, wherein the change requires a shift of the clutch and includes a target speed for the electric motor. At block 330, the shift is analyzed, and a determination is made whether the shift including the torque phase and inertia speed phase, including the corresponding change to engine speed while the engine speed and the speed of the motor are required to be equal, can be operated simultaneously without violating limits of the engine. In one embodiment, analyzing the shift includes monitoring parameters affecting shifting the clutch, determining whether the monitored parameters indicate that the shifting of the clutch will violate limits of the engine, and selectively enabling shifting the first clutch based upon the determining. One analysis can include determining whether simultaneously operating the torque phase and the inertia speed phase will cause the speed of the engine to violate a minimum speed of the engine or other limitations of the engine known in the art. If the answer in block 330 is no, then the process follows path 332, and at block 340 the shift is operated in series with a torque phase, followed by an inertia speed phase. If the answer in block 330 is yes, then the process follows path 334, and at blocks 350 and 360, a torque phase and an inertia speed phase are initiated, respectively, in parallel. At block 370, the process ends.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The disclosure has described certain preferred embodiments and modifications thereto. Further modifications and alterations may occur to others upon reading and understanding the specification. Therefore, it is intended that the disclo-

The invention claimed is:

1. Method to execute a shift in a powertrain comprising a plurality of torque generative devices comprising an engine and an electric motor rotatably connected through a first clutch, the method comprising:
   operating the powertrain in a continuously variable operating range state;
   monitoring a command to execute the shift comprising:
      monitoring a target speed for the electric motor; and
      monitoring a command to disengage the first clutch; and
   shifting the first clutch from an engaged state to a disengaged state, comprising:
      operating a torque phase of the first clutch wherein the first clutch is transitioned from the engaged state to the disengaged state including reducing clamping force between plates of the first clutch while maintaining the first clutch in synchronous operation;
      simultaneous with the torque phase, operating an inertia speed phase of the first clutch wherein a speed of the electric motor is transitioned from an initial speed to the target speed; and
      ending operating in the torque phase and continuing operating in the inertia speed phase to transition the electric motor to the target speed;
   wherein shifting the first clutch further comprises controlling a torque transmitted through the first clutch to exceed a maximum clutch torque capacity for the clutch at the end of the torque phase.

2. The method of claim 1, wherein ending operating in the torque phase and continuing operating in the inertia speed phase to transition the electric motor to the target speed comprises:
   monitoring parameters affecting shifting the first clutch to the disengaged state;
   determining whether the monitored parameters indicate that the operating in the torque phase will violate limits of the engine; and
   selectively disengaging the first clutch based upon the determining.

3. The method of claim 2, wherein determining whether the monitored parameters indicate that the operating in the torque phase will violate limits of the engine comprises determining whether the simultaneous operation of the inertia speed phase and the torque phase will cause a speed of the engine to violate a minimum speed of the engine.

4. The method of claim 1, wherein the simultaneous operation of the inertia speed phase comprises utilizing torque from a second electric motor to transition the speed of the first electric motor.

5. The method of claim 1, wherein shifting the first clutch further comprises:
   initiating the torque phase and the inertia speed phase at substantially the same time.

6. The method of claim 1, wherein
   the clutch rotatably connects the first electric motor and the internal combustion engine.

7. The method of claim 6, wherein the target speed comprises a speed outside of an operating speed range of the engine.

8. The method of claim 6, wherein the target speed equals zero.

9. The method of claim 6, further comprising:
   operating the inertia speed phase and the torque phase such that the speed of the engine is maintained within an operable engine speed range.

10. The method of claim 6, wherein the powertrain further comprises:
    a planetary gear set; and
    a second electric motor rotatably connected to the first electric motor through the planetary gear set;
    further comprising monitoring a command to change a mode of the powertrain;
    wherein the target speed for the first electric motor is based upon the command to change the mode of the powertrain; and
    wherein the command to execute the shift is based upon the command to change the mode of the powertrain.

11. The method of claim 10, wherein the powertrain further comprises:
    a second clutch selectively rotatably connecting a member of the planetary gear set to the first electric motor; and
    a third clutch selectively grounding the member of the planetary gear set.

12. Method to execute a shift in a powertrain comprising a plurality of torque generative devices including a first electric motor rotatably connected to a second electric motor through a planetary gear set, a first clutch selectively rotatably connecting an internal combustion engine to the first electric motor, a second clutch selectively rotatably connecting a member of the planetary gear set to the first electric motor, and a third clutch selectively grounding the member of the planetary gear set, wherein the second clutch is initially engaged connecting the first electric motor and the member of the planetary gear set the method comprising:
    operating the powertrain in a continuously variable operating range state;
    monitoring a command to execute the shift comprising:
       monitoring a target speed for a first torque generative device; and
       monitoring a command to disengage the first clutch;
    shifting the first clutch from an engaged state to a disengaged state, comprising:
       operating a torque phase of the first clutch wherein the first clutch is transitioned from the engaged state to the disengaged state;
       simultaneous with the torque phase, operating an inertia speed phase of the first clutch wherein a speed of the first torque generative device is transitioned from an initial speed to the target speed;
    monitoring a command to change a mode of the powertrain comprising monitoring a command to set the target speed for the first electric motor to zero;
    engaging the third clutch to ground the member of the planetary gear set when the speed of the first electric motor equals zero; and
    shifting the second clutch to an unlocked state when the third clutch has been engaged.

13. Method to execute a shift in a powertrain comprising a plurality of torque generative devices including a first electric motor rotatably connected to a second electric motor through a planetary gear set, a first clutch selectively rotatably connecting an internal combustion engine to the first electric motor, a second clutch selectively rotatably connecting a member of the planetary gear set to the first electric motor, and a third clutch selectively grounding the member of the planetary gear set, wherein the third clutch is initially engaged grounding the member of the planetary gear set, the method comprising:

operating the powertrain in a continuously variable operating range state;
monitoring a command to execute the shift comprising:
   monitoring a target speed for a first torque generative device; and
   monitoring a command to disengage the first clutch;
shifting the first clutch from an engaged state to a disengaged state, comprising:
   operating a torque phase of the first clutch wherein the first clutch is transitioned from the engaged state to the disengaged state;
   simultaneous with the torque phase, operating an inertia speed phase of the first clutch wherein a speed of the first torque generative device is transitioned from an initial speed to the target speed;
monitoring a command to change a mode of the powertrain comprising monitoring a command to set the target speed for the first electric motor to zero;
engaging the second clutch to connect the first electric motor and the member of the planetary gear set when the speed of the first electric motor equals zero; and
shifting the third clutch to an unlocked state when the second clutch has been engaged.

14. The method of claim 11, wherein the second electric motor is utilized to maintain a desired output torque and desired output speed through the inertia speed phase.

15. The method of claim 6, wherein monitoring the target speed for the first electric motor comprises:
   monitoring a dynamic speed profile to which the first electric motor is to be synchronized; and
   determining the target speed based upon the dynamic speed profile.

16. Method to execute a shift in a powertrain comprising a first electric motor, an internal combustion engine rotatably connected to the first electric motor through a first clutch, a planetary gear set including a first gear connected to the first motor through a second clutch, a third clutch selectively grounding the first gear of the planetary gear set and a member of the second clutch, and a second electric motor connected to a second gear of the planetary gear set, the method comprising:
   operating with the first clutch initially engaged and with the third clutch initially engaged;
   operating the powertrain in a continuously variable operating range state;
   monitoring a command to execute the shift comprising:
      monitoring a target speed for the first electric motor; and
      monitoring a command to disengage the first clutch;
   shifting the first clutch from an engaged state to a disengaged state, comprising:
      operating a torque phase of the first clutch wherein the first clutch is transitioned from the engaged state to the disengaged state including reducing clamping force between plates of the first clutch while maintaining the first clutch in synchronous operation;
      simultaneous with the torque phase, operating an inertia speed phase of the first clutch wherein a speed of the first electric motor is transitioned from an initial speed to the target speed;
      ending operating in the torque phase and continuing operating in the inertia speed phase to transition the electric motor to the target speed; and
      controlling a torque transmitted through the first clutch to exceed a maximum clutch torque capacity for the clutch at an end of the torque phase.

17. The method of claim 16, wherein ending operating in the torque phase and continuing operating in the inertia speed phase to transition the electric motor to the target speed comprises:
   monitoring parameters affecting shifting the first clutch to the disengaged state;
   determining whether the monitored parameters indicate that the operating in the torque phase will violate limits of the engine; and
   selectively shifting the first clutch based upon the determining.

18. System to control a shift in a powertrain comprising a planetary gear set, an internal combustion engine, and a first electric motor, comprising:
   the engine;
   the first electric motor;
   a clutch controlling transmission of torque between the engine and the first electric motor; and
   a control module:
      commanding a shift in the clutch from a locked state to an unlocked state, comprising:
         operating a torque phase of the clutch wherein the clutch is transitioned from the locked state to the unlocked state including reducing clamping force between plates of the first clutch while maintaining the first clutch in synchronous operation;
         simultaneous with the torque phase, operating an inertia speed phase of the clutch wherein a speed of the first electric motor is transitioned from an initial speed to a target speed;
         ending operating in the torque phase and continuing operating in the inertia speed phase to transition the electric motor to the target speed; and
         controlling a torque transmitted through the clutch to exceed a maximum clutch torque capacity for the clutch at an end of the torque phase;
   wherein the powertrain is operating in a continuously variable operating range state.

19. The system of claim 18, further comprising:
a second electric motor; and
wherein the control module utilizes the second electric motor to maintain a desired output torque and a desired output speed through the shift.

* * * * *